(12) United States Patent
Brandel et al.

(10) Patent No.: US 7,195,745 B2
(45) Date of Patent: Mar. 27, 2007

(54) METHOD OF PREPARING A PRODUCT BASED ON PHOSPHATE OF THORIUM AND/OR ACTINIDE(S)

(75) Inventors: Vladimir Brandel, Créteil (FR); Nicolas Dacheux, Gif sur Yvette (FR); Michel Genet, Palaiseau (FR)

(73) Assignee: Centre National de la Recherche Scientifique (FR)

( * ) Notice: Subject to any disclaimer, the term of this patent is extended or adjusted under 35 U.S.C. 154(b) by 254 days.

(21) Appl. No.: 10/504,052

(22) PCT Filed: Feb. 11, 2003

(86) PCT No.: PCT/FR03/00426

§ 371 (c)(1),
(2), (4) Date: Aug. 9, 2004

(87) PCT Pub. No.: WO03/068675

PCT Pub. Date: Aug. 21, 2003

(65) Prior Publication Data

US 2005/0145833 A1 Jul. 7, 2005

(30) Foreign Application Priority Data

Feb. 13, 2002 (FR) .................. 02 01760

(51) Int. Cl.
*C01B 25/26* (2006.01)
*C01F 15/00* (2006.01)
*C01G 43/00* (2006.01)
*C01G 56/00* (2006.01)
*G21F 9/00* (2006.01)

(52) U.S. Cl. .................. 423/2; 423/3; 423/11; 423/15; 423/18; 423/20; 423/21.1; 423/305; 423/306; 423/249; 423/250; 423/251; 423/252; 423/253; 423/263; 252/625; 588/1; 588/18; 588/20

(58) Field of Classification Search ................ 423/305, 423/306, 249, 250, 251, 252, 253, 263, 2, 423/3, 11, 15, 18, 20, 21.1; 252/625; 588/1, 588/18, 20
See application file for complete search history.

(56) References Cited

U.S. PATENT DOCUMENTS 3,351,436 A * 11/1967 Sarver .................. 423/252
3,764,553 A * 10/1973 Kirby .................... 588/2
5,403,565 A * 4/1995 Delloye et al. ............ 423/2
5,953,678 A    9/1999 Genet et al.

FOREIGN PATENT DOCUMENTS

WO    WO 96/30300    10/1996

OTHER PUBLICATIONS

P. Benard et al. "Th4(PO4)4P2O7, a New Thorium Phosphate: Synthesis, Characterization, and Structure Determination" Chem. Mater. 1996 (8), pp. 181-188.*
Dacheux et al., "Investigations of systems $ThO_2$-$MO_2$-$P_2O_5$ (M=U, Ce, Zr, Pu). Solid solutions of thorium-uranium (IV) and thorium-plutonium (IV) phosphate-diphosphates", Journal of Nuclear Materials, Feb. 1998, vol. 252, No. 3, pp. 179-186.
Dacheux et al., "Solid solutions of uranium and thorium phosphates: synthesis, characterization and X-ray photoelectron spectroscopy", New Journal of Chemistry, Mar. 1, 1996, vol. 20, No. 3, pp. 301-310.
Dacheux et al., Actinides immobilization in new matrices based on solid solutions: $Th_{4-x}M_x^{IV}(PO_4)_4P_2O_7$, ($M^{IV}={}^{238}U$, ${}^{239}Pu$), Journal of Alloys and Compounds, Jun. 12, 1998, vol. 271-273, pp. 236-239.
Dacheux et al., "Investigation of the sustem $ThO_2$-$NpO_2$-$P_2O_5$. Solid solutions of thorium-neptunium (IV) phosphate-diphosphate", Journal of Nuclear Materials, Nov. 1998, vol. 257, No. 2, pp. 108-117.
Thomas et al., "Kinetic and thermodynamic studies of the dissolution of thorium-uranium (IV) phosphate-diphosphate solid solutions", Journal of Nuclear Materials, Jun. 2001, vol. 295, No. 2-3, pp. 249-264.

* cited by examiner

Primary Examiner—Timothy C. Vanoy
(74) Attorney, Agent, or Firm—Hutchison Law Group PLLC

(57) ABSTRACT

The invention relates to a process for the preparation of a product based on a phosphate of at least one element M(IV), for example of thorium and/or of actinide(IV)(s).

This process comprises the following stages:
a) mixing a solution of thorium(IV) and/or of at least one actinide(IV) with a phosphoric acid solution in amounts such that the molar ratio $$\frac{PO_4}{M(IV)}$$

is from 1.4 to 2,
b) heating the mixture of the solutions in a closed container at a temperature of 50 to 250° C. in order to precipitate a product comprising a phosphate of at least one element M chosen from thorium(IV) and actinide (IV)s having a P/M molar ratio of 1.5, and
c) separating the precipitated product from the solution.

The precipitate can be converted to phosphate/diphosphate of thorium and of actinide(s). The process also applies to the separation of uranyl ions from other cations.

17 Claims, 2 Drawing Sheets

METHOD OF PREPARING A PRODUCT BASED ON PHOSPHATE OF THORIUM AND/OR ACTINIDE(S)

TECHNICAL FIELD

A subject-matter of the present invention is the production of products based on phosphate of thorium and/or of actinides which can be used for the conditioning and treatment of reactive waste, such as liquid effluents.

More specifically, it relates to the preparation of precursor products of thorium phosphate/diphosphate of formula $Th_4(PO_4)_4P_2O_7$ (TPD) or of formula $Th_{4-x}M_x(PO_4)_4P_2O_7$ in which M is a tetravalent actinide, such as Pa, U, Np and Pu.

STATE OF THE PRIOR ART

The document WO 96/30300 [1] disclosed several processes for the synthesis and characterization of thorium phosphate $Th_4(PO_4)_4P_2O_7$ as conditioning matrix for the storage of nuclear waste.

The syntheses relate to various media. For the syntheses which take place in a liquid medium, they report a mixture of aqueous solutions of chemicals (thorium salts, compounds comprising nuclear waste, acids, bases) which always results in concentrated solutions.

A dry and amorphous residue is obtained from these concentrated solutions, mainly by evaporation of the volatile materials (water and acids, for example), which residue will result, by calcination at 850–1300° C., in the fully crystalline thorium phosphate/diphosphate $Th_4(PO_4)_4P_2O_7$, which then has the properties required for good retention of the nuclear waste which is incorporated therein.

In this process, the stage which consists in carrying out the evaporation of concentrated solutions is entirely achievable but under extreme conditions. This is because it concerns the evaporation of chemically highly aggressive solutions (acidic or basic) comprising very high levels of radioactivity. This route is therefore technically possible but difficult.

ACCOUNT OF THE INVENTION

A subject-matter of the present invention is specifically a process for the preparation of a product based on phosphate of thorium and/or of actinide(s) which can be easily converted to thorium phosphate/diphosphate without requiring a stage of evaporation of aggressive solutions.

According to the invention, the process for the preparation of a product comprising a phosphate of at least one element M(IV) chosen from thorium(IV) and actinide(IV)s is characterized in that it comprises the following stages:

a) mixing a solution comprising thorium(IV) and/or at least one actinide(IV) with a phosphoric acid solution in amounts such that the molar ratio $$\frac{PO_4}{M(IV)}$$

where M(IV) represents the total concentration of thorium (IV) and/or actinide(IV)s, is from 1.4 to 2, preferably from 1.5 to 1.8, b) heating the mixture of the solutions in a closed container at a temperature of 50 to 250° C. to precipitate a product comprising a phosphate of at least one element M chosen from thorium(IV) and actinide(IV)s having a P/M molar ratio of 1.5, and c) separating the precipitated product from the solution.

Thus, according to this process, the starting materials are exclusively acidic solutions having a substantially identical chemical composition to that described above, and a crystalline precursor is obtained by mild chemistry, that is to say by moderate heating of the mixture in a closed container, to avoid, this time, the evaporation and to promote the precipitation of this precursor. The latter will subsequently be easily separated, by settling, filtration or centrifuging at ambient temperature, from the solution which has given rise to it. This process thus avoids the stage of evaporation and the treatment of the gaseous effluents inherent in the process disclosed in WO 96/30300 [1].

This is particularly advantageous when the process is used for the treatment of liquid effluents as the need to evaporate radioactive acidic solutions and to treat the gaseous effluents resulting from the evaporation is thus avoided.

According to the invention, the heating is carried out in a closed chamber at a moderate temperature (50 to 250° C.) for a variable period of time which depends on the temperature used and on the nature of M(IV). This period of time can range, for example, from 1 hour to 1 month, in order to obtain a finely crystalline solid which can be easily separated from the solution after the latter has been cooled.

The heating time is an important parameter as it has a direct influence on the quality of the precipitate formed.

For this heating, the mixture of the solutions of M(IV) and of phosphoric acid is introduced, for example, into a Teflon container with a screw cap which is highly leaktight.

The container can be heated by any means, for example in an electric resistance oven, in a microwave oven, in a sand bath, in an oil bath or alternatively by using an infrared lamp or a stream of hot gas.

According to one advantageous characteristic, the process for the invention furthermore comprises the following stages:

d) washing with water the precipitated product thus separated, and e) drying the washed product, for example in an oven.

The solutions comprising thorium and/or one or more actinides which can be used in this process can be prepared, for example, from salts, such as chlorides, bromides, nitrates, sulphates and oxalates.

It is also possible to prepare them by any method which makes possible the introduction of actinide(IV)s ions into solution, for example by dissolution of the metal or of the oxide.

The process described above can be used to prepare thorium phosphate/diphosphate of formula $Th_4(PO_4)_4P_2O_7$ by using, in stage a), a solution comprising thorium and phosphoric acid and by subjecting the product based on thorium(IV) phosphate, separated by precipitation, to a heat treatment carried out at least partially at a temperature of 700 to 1300° C.

It is also possible to use the process of the invention to prepare a solid solution of phosphates of thorium and of at least one tetravalent actinide by using, in stage a), a solution comprising thorium and at least one tetravalent actinide and phosphoric acid and by subjecting the product based on phosphates of thorium(IV) and of actinide(IV) (s) obtained to a heat treatment carried out at least partially at a temperature of 700 to 1300° C.

For example, the heat treatment is carried out in two stages, a first precalcination stage carried out at a temperature of 300 to 500° C. for 1 to 5 h and a second calcination stage carried out at a temperature of 1100 to 1300° C. for 3 to 15 h.

It is also possible to carry out a cold compacting of the powder before carrying out the heat treatment, in order to obtain a sintered product.

Thus, the process of the invention makes it possible to obtain a sintered product under better conditions (temperature, duration, pressure) than in the case of the document [1], because of the better physicochemical properties (particle size, specific surface) of the precipitated product.

It is thus possible to prepare solid solutions of phosphates corresponding to the formula:

$$Th_{4-x}M_x(PO_4)_4P_2O_7$$

in which M is an element chosen from Pa(IV), U(IV), Np(IV) and Pu(IV), and x satisfies the following conditions:

$x \leq 3.75$ for Pa(IV)
$x \leq 3$ for U(IV)
$x \leq 2.14$ for Np(IV)
$x \leq 1.67$ for Pu(IV).

For the implementation of the process of the invention, it is possible to use, for example, as thorium solution, a solution of $ThCl_4$ in hydrochloric acid or a solution of thorium nitrate in nitric acid. The $ThCl_4$ solution can be obtained by dissolution of solid $ThCl_4$ in a 0.5 to 2M hydrochloric acid solution, in order to obtain a 0.5 to 2M $ThCl_4$ solution. The solution of thorium in a nitric acid medium can be obtained by dissolution of $Th(NO_3)_4 \cdot 5H_2O$ in a 0.5 to 5M $HNO_3$ solution, in order to obtain a 0.5 to 2M Th solution.

When the actinide is uranium(IV), the uranium(IV) solution can be a solution of $UCl_4$ in hydrochloric acid, for example obtained by dissolution of $UCl_4$ in 0.5 to 6M HCl or by dissolution of uranium metal in 6M HCl, subsequently brought to the desired concentration, for example 0.5 to 1.5M in U, by dilution with deionized water.

When the actinide is neptunium(IV), the neptunium(IV) solution can be a solution of neptunium in nitric acid, for example obtained by dissolution of solid $NpO_2$ in 4 to 5M $HNO_3$ and dilution with deionized water, in order to have a nitric acid concentration of 1 to 4M and an Np concentration of 0.1 to 0.3M.

When the actinide is plutonium(IV), the plutonium solution can be a solution of plutonium in nitric acid, for example obtained by dissolution of $PuO_2$ in a 4 to 5M nitric acid $HNO_3$ solution and dilution with deionized water, in order to obtain a nitric acid concentration of 1 to 4M and a Pu concentration of 0.2 to 0.6M.

Thus, the process of the invention makes it possible to prepare thorium phosphate/diphosphate when it is carried out with a thorium solution to which a phosphoric acid solution is added in the desired molar ratio. A gel is thus formed, which gel, in the closed container, is subsequently converted by heating to a precipitate formed of a crystalline powder. This powder can subsequently be converted to thorium phosphate/diphosphate (TPD) by heat treatment.

The process of the invention can also be used to prepare an actinide phosphate, for example a uranium(IV) phosphate, by first of all forming a uranium phosphate precipitate which is subsequently converted by heat treatment to a phosphate with a different structure from that of thorium phosphate/diphosphate, corresponding to a polyphase system.

For this preparation, use is made, in stage a), of a solution comprising uranium and phosphoric acid, and the precipitated product is subjected to a heat treatment carried out at least partially at a temperature of 700 to 1300° C.

In this case, the acidic uranium solution must not comprise an oxidizing agent as, in the presence of an oxidizing agent, such as, for example, nitric acid, the tetravalent uranium is oxidized to hexavalent uranium in the form of the uranyl ion $UO_2^{2+}$, which will not form a precipitate under the conditions of the process of the invention.

The process can also be used to form solid solutions of tetravalent actinides starting from a mixture of acidic solutions comprising several actinide(IV)s and of phosphoric acid, which is subsequently subjected to heating in a closed container at a temperature of 50 to 250° C. to precipitate a product comprising actinide phosphates.

When the starting material is a solution of thorium and of actinide(s), a very homogeneous powder composed of particles with a size of less than 3 μm is obtained by precipitation followed by heating in the closed chamber, which powder can be converted by heat treatment to a phosphate/diphosphate of thorium and of uranium(IV).

It is also possible to include trivalent elements or other tetravalent elements in this phosphate/diphosphate of thorium and/or of tetravalent actinide(s) by coprecipitating the trivalent elements with the tetravalent elements during the heating in a closed chamber. At the end of the operation, a two-phase or polyphase system composed of phosphate/diphosphate of thorium and/or of tetravalent actinide(s), and of a phosphate comprising trivalent lanthanide elements, such as gadolinium and lanthanum, and/or trivalent actinide elements, such as americium and curium, is obtained.

It is also possible to prepare, from the product based on phosphate of thorium(IV) and/or of actinide(IV)(s) obtained by precipitation following stages a) to c), a composite material including at least one actinide(III) and/or at least one lanthanide(III) in the phosphate form, such as monazite $M(III)PO_4$, xenotime $M(III)PO_4$ and brabantite $M(II)_xM'(IV)_xM''(III)_{(2-2x)}(PO_4)_2$.

This material can be prepared by dispersing a powder of the phosphate(s) formed beforehand in the precipitate of the product comprising a phosphate of thorium(IV) and/or of actinide(IV)(s) and by subsequently subjecting the combination to a heat treatment, optionally preceded by a compacting, carried out at least partially at a temperature of 700 to 1300° C.

A further subject-matter of the invention is a process for the separation of uranium(VI), in the form of the uranyl ion $UO_2^{2+}$, present in a solution with other cations, including thorium, according to which phosphoric acid is added to the solution in an amount such that the phosphoric acid/other cation molar ratio is from 1.4 to 2, the solution thus obtained is heated at a temperature of 50 to 250° C. in a closed container, in order to precipitate a product comprising the cations other than uranium, and the solution comprising uranium(VI) is recovered.

This is because uranyl phosphate $(UO_2)_3(PO_4)_2 \cdot 5H_2O$, which is more soluble than phosphates of trivalent and tetravalent cations, such as, for example, actinides and lanthanides, may not precipitate under certain operating conditions. It is therefore possible to separate uranium from the other cations by varying the concentrations of the entities in solution and the acidity of the medium, so as to form a precipitate comprising the other cations and to leave the uranium in solution.

A further subject-matter of the invention is a process for the decontamination of radioactive aqueous effluents which consist in precipitating a product based on thorium phosphate from the effluent by addition of thorium and then of phosphoric acid to the effluent in amounts such that the P/Th molar ratio is from 1.4 to 2 and in heating in a closed container at a temperature of 50 to 250° C. in order to precipitate a product comprising thorium phosphate from the effluent, thus entraining the contaminating radioactive cations.

Other characteristics and advantages of the invention will become more clearly apparent on reading the description which follows of examples, of course given by way of illustration and without implied limitation, with reference to the appended drawings.

DETAILED ACCOUNT OF THE EMBODIMENTS

Example 1

Preparation of the Thorium Phosphate/Diphosphate (TPD)

a) Preparation of the Precursor

A thorium solution is prepared by dissolving 4 g of solid $ThCl_4$ in a 2M hydrochloric acid solution in a Teflon container to obtain a thorium concentration of 0.7M. A 5M phosphoric acid $H_3PO_4$ solution, obtained by diluting approximately 14M concentrated acid with deionized water, is gradually added to this solution with stirring to obtain a phosphoric acid/thorium molar ratio of 3/2 with an excess of phosphoric acid of 2%. Stirring is then halted and the container is closed and heated at a temperature of 150° C. on a sand bath for 21 days. The gel initially formed is converted under these conditions to a precipitate. The reaction which occurs results in the production of a crystalline thorium phosphate.

The container is cooled and the precipitate is allowed to separate by settling until a clear supernatant is obtained.

The supernatant is removed using a pipette and is replaced with deionized water. The combined mixture is suspended by stirring, the precipitate is then allowed to separate by settling and the operation is repeated until a supernatant is obtained with a pH in the region of that of the deionized water. The precipitate is then filtered off on a sintered glass funnel under vacuum and is then dried at 120° C.

Figure 1:
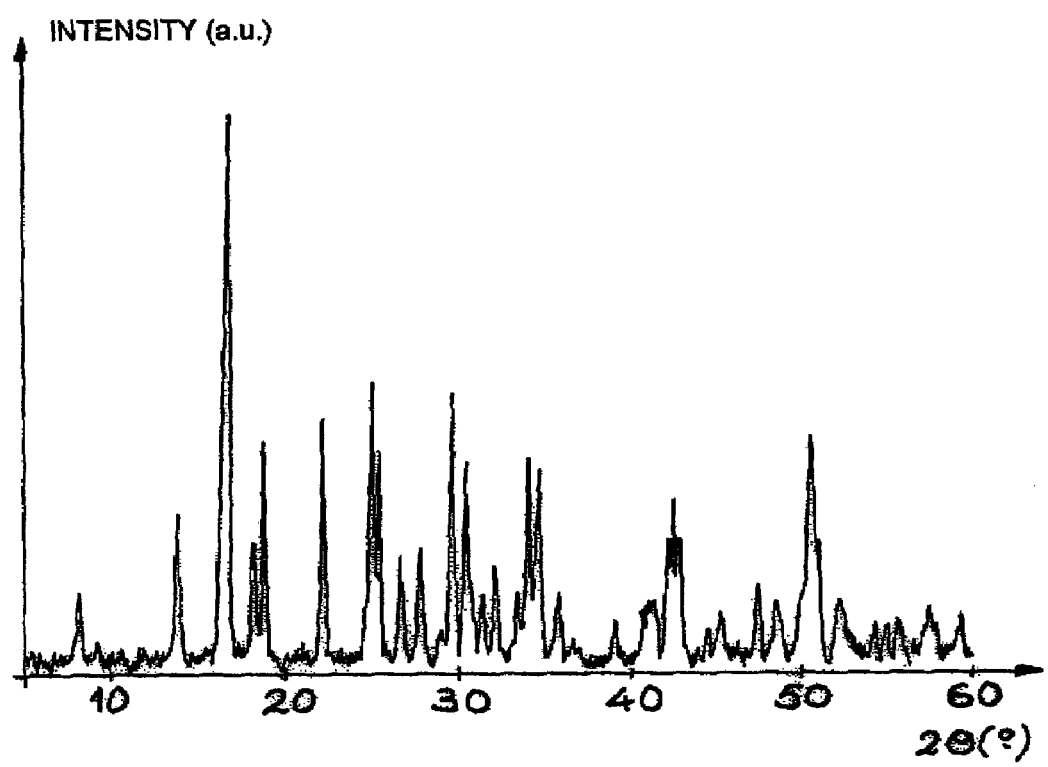
FIG. 1 is an X-ray diffraction diagram of the thorium phosphate/diphosphate precursor obtained in Example 1.

The X-ray diffraction diagram of the dried product is represented in FIG. 1.

Figure 2:
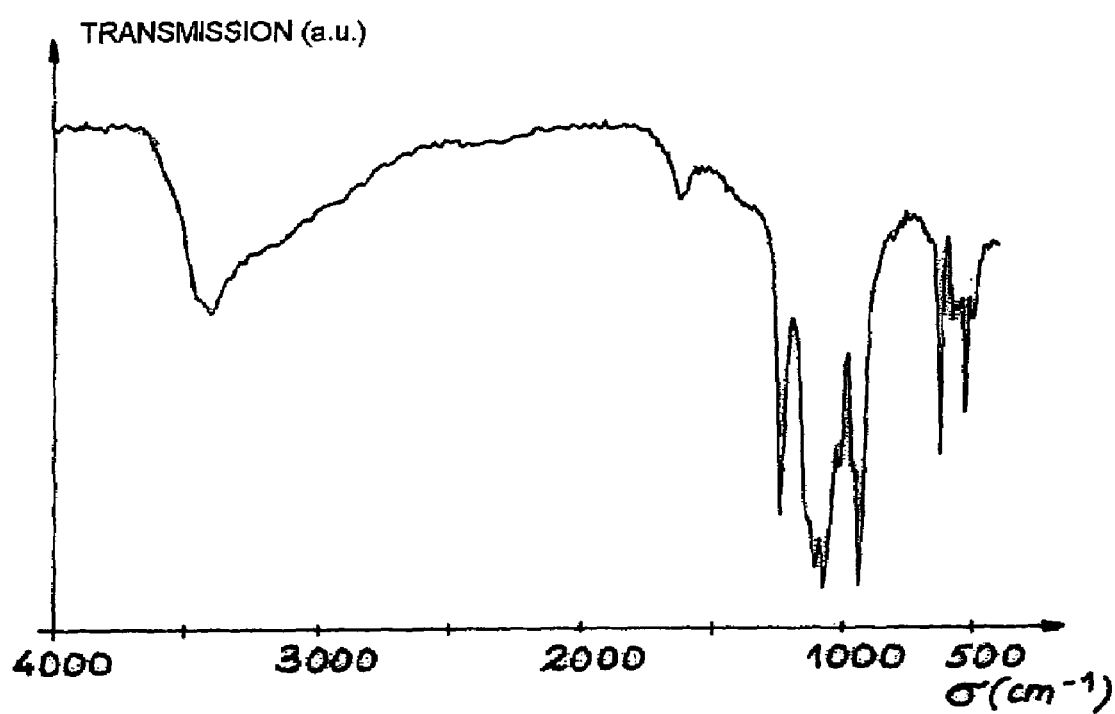
FIG. 2 is the infrared spectrum of this same precursor.

The infrared spectrum of the same product is represented in FIG. 2.

If the diagram of FIG. 1 is compared with the diagram of the thorium phosphate/diphosphate (TPD) illustrated in FIG. 1 of WO 96/30300 [1], it is noticed that this product is different from the thorium phosphate/diphosphate; it is a precursor of the TPD.

b) Preparation of the TPD

The precursor obtained above can be converted to thorium phosphate/diphosphate by subjecting it first of all to a precalcination at 400° C. for 2 h and then to a calcination at a temperature of 1150° C. for 10 h.

The characteristics of the calcined product clearly correspond to those of the thorium phosphate/diphosphate of the document [1].

Example 2

Preparation of a Precursor Product of Uranium(IV) Phosphate a) Preparation of the Precursor The same procedure is followed as in Example 1. Thus, a uranium(IV) solution is first of all prepared by dissolution of 4 g of $UCl_4$ in a 4M hydrochloric acid HCl solution in order to obtain a uranium concentration of 0.7M. This solution is mixed with a 5M phosphoric acid solution in the phosphoric acid/uranium(IV) molar ratio of 3/2 with an excess of 2% of phosphoric acid. The mixing is carried out in a container which is subsequently closed and which is heated, as in Example 1, at a temperature of 150° C. on a sand bath for 1 week. Under these conditions, the initial gel is converted by heating to a crystalline powder.

The powder is separated, is washed and is then dried as in Example 1.

Figure 3:
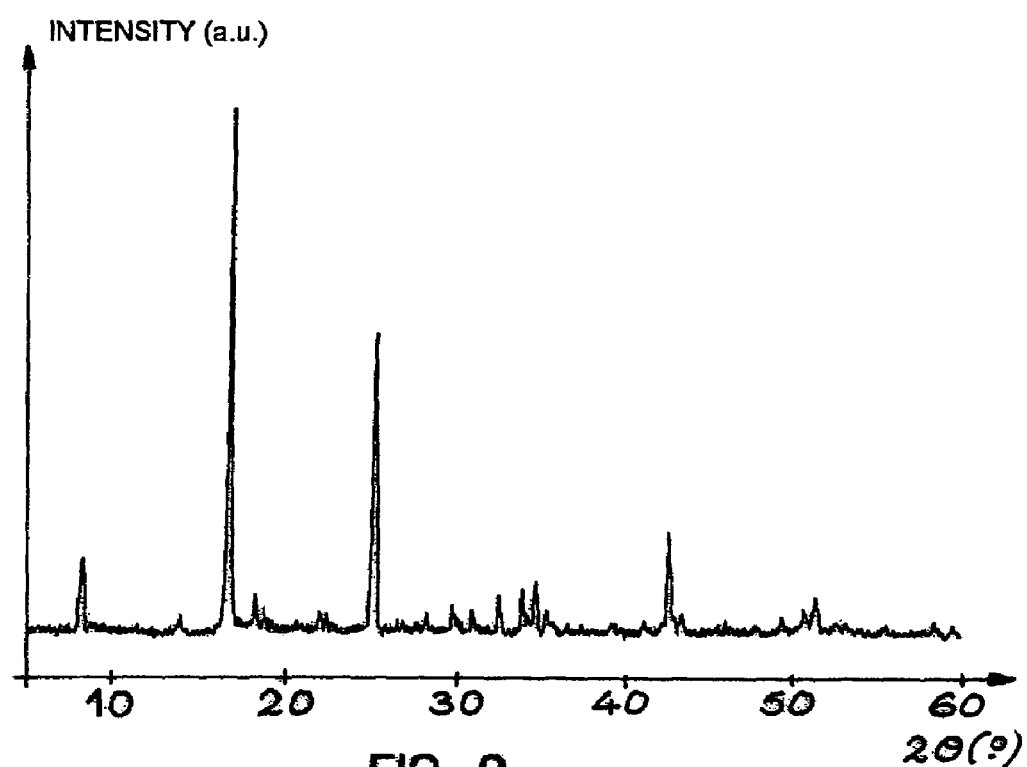
FIG. 3 is an X-ray diffraction diagram of the uranium(IV) phosphate obtained in Example 2.

The X-ray diffraction diagram of the product obtained is represented in FIG. 3.

Figure 4:
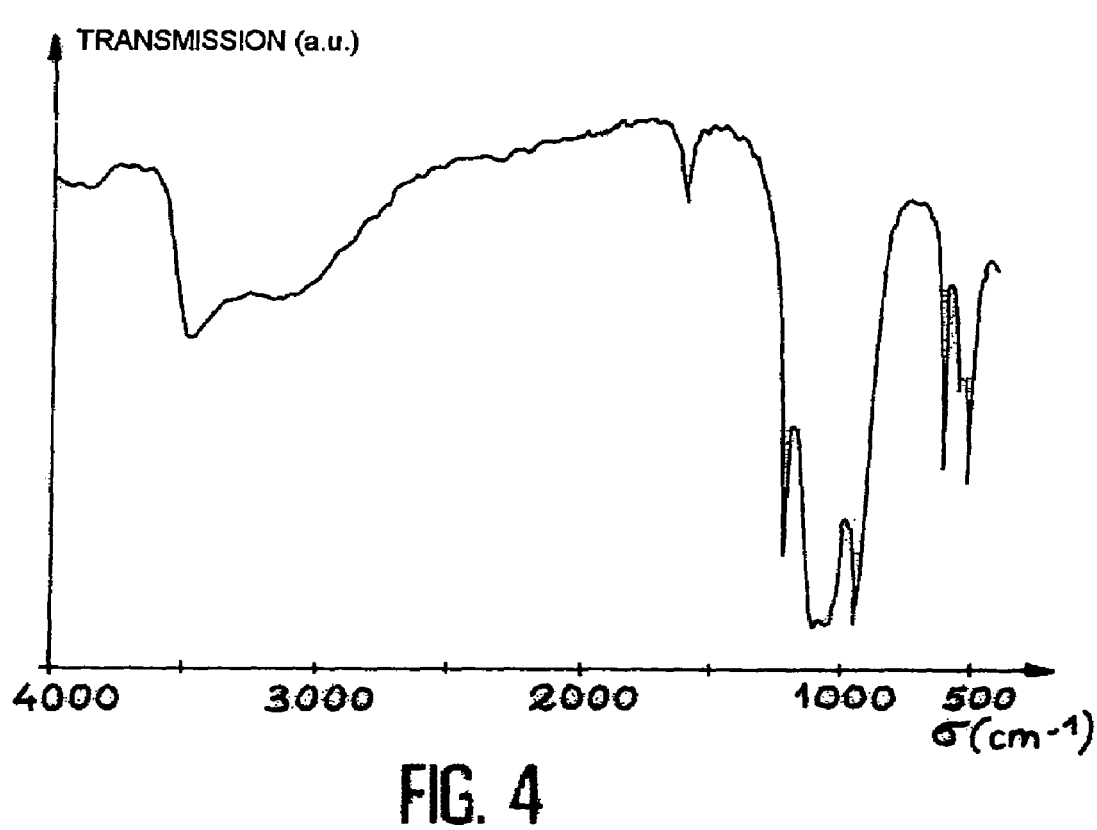
FIG. 4 is the infrared spectrum of this uranium(IV) phosphate.

The infrared spectrum of this product is represented in FIG. 4.

b) Preparation of the Uranium Phosphate

The product obtained above is subjected to a precalcination and to a calcination as in Example 1 and a polyphase uranium phosphate system is thus obtained.

Products based on protactinium(IV) phosphate, on neptunium(IV) phosphate or on plutonium(IV) phosphate can be prepared in the same way by using the same phosphoric acid/actinide(IV) molar ratio and by preparing the mixture from an acidic protactinium(IV), neptunium(IV) or plutonium(IV) solution.

Example 3

Preparation of a Solid Solution of Phosphate/Diphosphate of Thorium and of Actinide(IV)

In this case, the preparation is carried out of a solution of thorium and of actinide(IV) in proportions which make it possible to obtain a phosphate/diphosphate of formula $Th_{4-x}M_x(PO_4)_4P_2O_7$ in which M represents the actinide(IV), with x exhibiting the following values:

$x \leq 3.75$ for Pa(IV)
$x \leq 3$ for U(IV)
$x \leq 2.14$ for Np(IV)
$x \leq 1.67$ for Pu(IV).

The thorium solution obtained in Example 1 is mixed with an actinide solution, and mixing is carried out with a 5M phosphoric acid solution as in the preceding examples. The amounts of thorium, of actinide M and of phosphoric acid are such that the phosphoric acid/Th+M molar ratio is 3/2 with an excess of phosphoric acid of 2%. This mixture is subsequently subjected to heating in a closed container at a temperature of 150° C. on a sand bath for 1 week.

The gel initially formed is converted to a powder. The powder is separated, is washed and is dried as in Example 1. The dried powder is very homogeneous and is composed of particles with a size of less than 3 µm. The corresponding specific surface is close to 10 m²/g, which confers a higher reactivity thereon.

This high reactivity of the powder renders it highly advantageous for the conditioning of the radioactive actinides introduced into the thorium phosphate/diphosphate.

This is because a powder is obtained which has better physicochemical properties than those of the powder obtained in the document [1].

The powder is subsequently subjected to a heat treatment at a temperature of 1250° C. for 10 h to form the solid solution of phosphate/diphosphate of thorium and of actinide(IV) of formula $Th_{4-x}M_x(PO_4)_4P_2O_7$.

The specific surface of the powder significantly decreases for heat treatment temperatures greater than or equal to 800° C. Correspondingly, the size of the particles increases until it reaches 10 to 20 µm at 1250° C.

If, prior to the heat treatment, the powder is compacted at 500 MPa, the density of the product reaches 95% of that calculated, after only 5 hours of heat treatment, which corresponds to approximately 5% of total porosity, approximately equally divided between open porosity and closed porosity.

Furthermore, the specific surface of the pellets is between 750 and 1500 cm²/g, which makes it possible, during leaching tests, to reduce by a factor of approximately 6 the rate of dissolution of the solid with respect to that of the powder. In addition to the influence of the specific surface on the rate of leaching, studies undertaken confirm the very good physicochemical properties of confinement of the solid solution of phosphate/diphosphate of thorium and of tetravalent actinide, such as uranium(IV).

Example 4

Preparation of a Composite Sintered Glass Based on Phosphate/Diphosphate of Thorium and of Uranium(IV) and on Gadolinium Phosphate Solutions of thorium (0.7M) and of uranium(IV) (0.6M) in a hydrochloric acid medium are mixed, as described in the preceding examples, so as to observe a Th/U molar ratio of 1.5, and then a 5M phosphoric acid solution is added in the $PO_4/(Th+U)$ molar ratio of 1.5. This mixture is placed in a closed container and is heated on a sand bath at 150° C. for 2 days. The crystalline precipitate of phosphate of thorium and of uranium(IV) thus obtained is filtered off, washed and then dried as described in Example 3.

Beforehand, a gadolinium phosphate powder is prepared by precipitation (or evaporation to dryness), heated at 150° C., filtered off, dried, milled and then treated at 1250° C. for 10 hours. The $GdPO_4$ powder then crystallizes in the monazite structure. It is homogeneous and single-phase and is characterized by a specific surface of 1 to 3 m²/g and a mean particle size of less than 2 µm, which confers a high reactivity thereon.

This powder is dispersed in the phosphate of thorium and of uranium(IV) in the phosphate of thorium and of uranium (IV)/gadolinium phosphate ratio by mass of 70/30. The mixture is milled, compacted at 500 MPa and then treated at 1250° C. for 10 hours under an inert atmosphere (for example, under an argon atmosphere). After heat treatment at 1250° C., a dense sintered glass is thus obtained, formed of a solid solution of phosphate/diphosphate of thorium and of uranium(IV) of formula $Th_{2.4}U_{1.6}(PO_4)_4P_2O_7$ comprising, in dispersion, gadolinium phosphate $GdPO_4$ with a structure of monazite type.

The gadolinium (used as neutron poison) can be partially substituted by americium and/or curium, while the uranium (IV) can be substituted by neptunium(IV) and/or plutonium (IV), which then makes it possible to prepare composite samples simultaneously comprising trivalent and tetravalent actinides.

Example 5

Separation of Uranium(VI) from Divalent, Trivalent and Tetravalent Ions in Solution The starting material is a solution comprising 0.1M thorium nitrate and 0.1M uranyl nitrate in 2M nitric acid, and a 5M phosphoric acid $H_3PO_4$ solution is added thereto in order to have a phosphoric acid/thorium stoichiometric ratio of 1.5 with 2% excess of phosphoric acid. A gel is thus formed, which gel includes the ions, and then the gel is heated in a closed container at a temperature of 150° C. until a precipitate is obtained which comprises the precursor of the thorium phosphate/diphosphate, whereas the uranyl ion remains in the supernatant.

Uranium(VI) can thus be recovered by separation by settling, filtration and washing.

If the solution comprises other divalent cations, such as $Ca^{2+}$, $Ba^{2+}$ and $Sr^{2+}$, and other trivalent cations, such as $La^{3+}$, $Gd^{3+}$ and $Ce^{3+}$, the latter are entrained with the thorium phosphate in the precipitate form whereas uranium (VI) remains in solution.

It is the same if the solution comprises other tetravalent actinides, which will be entrained in the solid phase with the thorium.

The same procedure can be followed for decontaminating radioactive liquid effluents.

REFERENCE CITED

[1] WO 96/30300

The invention claimed is:

1. Process for the preparation of a product comprising a phosphate of at least one element M(IV) chosen from thorium(IV) and actinide(IV)s, wherein it comprises the following stages:
   a) mixing a solution comprising thorium(IV) and/or at least one actinide(IV) with a phosphoric acid solution in amounts such that the molar ratio $$\frac{PO_4}{M(IV)}$$

where M(IV) represents the total concentration of thorium(IV) and/or actinide(IV)s, is from 1.4 to 2,
   b) heating the mixture of the solutions in a closed container at a temperature of 50 to 250° C. to precipitate a product comprising a phosphate of at least one element M chosen from thorium(IV) and actinide(IV)s having a P/M molar ratio of 1.5, and
   c) separating the precipitated product from the solution.
2. Process according to claim 1, which additionally comprises the following stages:
   d) washing with water the precipitated product thus separated, and
   e) drying the washed product.

3. Process according to claim 1, in which the thorium solution is a solution of ThCl$_4$ in hydrochloric acid.

4. Process according to claim 1, in which the actinide is uranium(IV) and the uranium(IV) solution is a solution of UCl$_4$ in hydrochloric acid.

5. Process according to claim 1, in which the actinide is neptunium(IV) and the neptunium(IV) solution is a solution of neptunium in nitric acid.

6. Process according to claim 1, in which the actinide is plutonium(IV) and the plutonium(IV) solution is a solution of plutonium in nitric acid.

7. Process according to claim 1, in which, in stage a), at least one element chosen from trivalent actinides and trivalent lanthanides is additionally added to the mixture in order to include trivalent actinide(s) and/or trivalent lanthanide(s) in the product precipitated in stage b).

8. Process for the preparation of thorium phosphate/diphosphate of formula Th$_4$(PO$_4$)$_4$P$_2$O$_7$, wherein a product based on thorium(IV) phosphate is prepared by carrying out the process according to claim 1 using, in stage a), a solution comprising thorium and phosphoric acid and wherein the product based on thorium(IV) phosphate is subjected to a heat treatment carried out at least partially at a temperature of 700° C. to 1300° C.

9. Process according to claim 8, in which the heat treatment is carried out in two stages which are respectively a first stage carried out at a temperature of 300 to 500° C. for 1 h to 5 hours and a second stage carried out at a temperature of 1100 to 1300° C. for 3 to 15 h.

10. Process for the preparation of uranium phosphate, wherein a product based on uranium(IV) phosphate is prepared by carrying out the process according to claim 1 using, in stage a), a solution comprising uranium and phosphoric acid and wherein the product based on uranium(IV) phosphate is subjected to a heat treatment carried out at least partially at a temperature of 700° C. to 1300° C.

11. Process according to claim 10, in which the heat treatment is carried out in two stages which are respectively a first stage carried out at a temperature of 300 to 500° C. for 1 h to 5 hours and a second stage carried out at a temperature of 1100 to 1300° C. for 3 to 15 h.

12. Process for the preparation of a solid solution of phosphates of thorium and of at least one tetravalent actinide, wherein a product comprising phosphates of Th and of at least one tetravalent actinide is prepared by carrying out the process according to claim 1 using, in stage a), a solution comprising thorium and at least one actinide and phosphoric acid and wherein the product based on phosphates of thorium(IV) and of actinide(IV) is subjected to a heat treatment carried out at least partially at a temperature of 700° C. to 1300° C.

13. Process according to claim 12, in which the solid solution of phosphates corresponds to the formula:

$$Th_{4-x}M_x(PO_4)_4P_2O_7$$

in which M is an element chosen from Pa(IV), U(IV), Np(IV) and Pu(IV), and x satisfies the following conditions:
  $x \leq 3.75$ for Pa(IV)
  $x \leq 3$ for U(IV)
  $x \leq 2.14$ for Np(IV)
  $x \leq 1.67$ for Pu(IV).

14. Process according to claim 12, in which the heat treatment is carried out in two stages which are respectively a first stage carried out at a temperature of 300 to 500° C. for 1 h to 5 hours and a second stage carried out at a temperature of 1100 to 1300° C. for 3 to 15 h.

15. Process for the preparation of a composite material including at least one actinide(III) and/or at least one lanthanide(III), wherein the precipitate comprising a phosphate of Th(IV) and/or of actinide(IV)(s) is prepared by carrying out the process according to claim 1 and wherein a powder comprising at least one actinide(III) and/or at least one lanthanide(III) in the phosphate form is dispersed in the precipitate and wherein the combination is subsequently subjected to a heat treatment, optionally preceded by a compacting, carried out at least partially at a temperature of 700 to 1300° C.

16. Process for the separation of uranium(VI), in the form of the uranyl ion UO$_2^{2+}$, present in a solution with other cations, including thorium, wherein phosphoric acid is added to the solution in an amount such that the molar ratio $$\frac{\text{phosphoric acid}}{\text{other cations}}$$

is from 1.4 to 2, wherein the solution thus obtained is heated at a temperature of 50 to 250° C. in a closed container, in order to precipitate a product comprising the cations other than uranium, and wherein the solution comprising uranium (VI) is recovered.

17. Process for the decontamination of radioactive aqueous effluent comprising contaminating radioactive cations, the process comprising:
  adding thorium and then phosphoric acid to the effluent in amounts such that the P/Th molar ratio is from 1.4 to 2;
  heating the effluent in a closed container at a temperature of 50 to 250° C.; and
  precipitating a product from the effluent comprising thorium phosphate and entrained contaminating radioactive cations.

* * * * *